United States Patent [19]

Elbert et al.

[11] 4,194,673
[45] Mar. 25, 1980

[54] STRESS RELIEVING OF METAL/CERAMIC ABRADABLE SEALS

[75] Inventors: Raymond J. Elbert, Middleburg Heights; Raymond V. Sara, North Olmsted, both of Ohio

[73] Assignee: Union Carbide Corporation, New York, N.Y.

[21] Appl. No.: 849,897

[22] Filed: Nov. 9, 1977

[51] Int. Cl.² .............................................. B23K 1/04
[52] U.S. Cl. ........................... 228/219; 228/221; 228/222; 228/238
[58] Field of Search ............... 228/222, 238, 239, 122, 228/219, 221

[56] References Cited

U.S. PATENT DOCUMENTS

| 3,359,623 | 12/1967 | Gwyn, Jr. ............... 228/238 X |
| 3,599,317 | 8/1971 | Purdy et al. ............ 228/239 X |
| 3,673,677 | 7/1972 | Loqvist .................. 228/222 X |
| 3,677,060 | 7/1972 | Loquist .................. 228/122 X |
| 3,975,165 | 8/1976 | Elbert et al. ............ 428/550 |

FOREIGN PATENT DOCUMENTS 931268  7/1963  United Kingdom .................... 228/238

Primary Examiner—C. W. Lanham
Assistant Examiner—Kenneth J. Ramsey
Attorney, Agent, or Firm—J. Hart Evans

[57] ABSTRACT

Metal/ceramic abradable seals of the type used in jet aircraft are improved by maintaining a temperature differential between the metal/ceramic composite and the cooler substrate during cooling from the brazing temperature.

18 Claims, 4 Drawing Figures

STRESS RELIEVING OF METAL/CERAMIC ABRADABLE SEALS

This invention relates to metal/ceramic abradable seals of the type used in jet aircraft. More particularly it relates to a method of making such seals in which stresses are relieved during cooling of the seal structure after fabrication.

A graded metal-to-ceramic structure for high temperature abradable seal applications is described and claimed in U.S. Pat. No. 3,975,165, together with a method of making it. Seals made according to the teachings of this patent contain appropriately formulated mixtures of metal and ceramic between the ceramic surface of the composite seal member and the substrate to which it is fused, whereby thermal expansion differences are reduced. As a result of the graded construction shear stresses, which would likely cause failure of the seal, are significantly reduced.

Despite this reduction in shear stresses, however, residual stresses may remain large. For example, a nichrome-$ZrO_2$ structure isothermally cooled from bonding temperatures may develop residual compressive and tensile stresses in the ceramic and metal-rich layers, respectively. When the graded composite structure is attached to a stiff or rigid substrate such stresses occur and can build up rapidly. The dimensionally stable structure required for most applications therefore, is certain to develop large residual stresses after processing.

An object of the present invention therefore, is to prepare sound ceramic/metal composite structures which are abradable and resistant to thermal shock. A further object is to provide a process for obtaining such structures by utilization of an in-process stress relieving principle of sintering and/or cooling the structure in a thermal gradient.

According to our invention metal/ceramic abradable seals of the type used in jet aircraft are improved by maintaining a temperature differential between the metal/ceramic composite and the cooler substrate during cooling from the brazing temperature.

In the operation of our invention the graded metal/ceramic composite is placed on the substrate, which preferably has a braze tape or fused coat of braze powder, and heated to a temperature sufficient to braze or fuse the metal-rich surface of the composite to the substrate. A temperature of about 1200° C. is preferred for this brazing operation and is maintained for a sufficient time, typically about one hour, this heating step can be isothermal or a slight temperature gradient can be maintained, with the substrate up to 450° C. cooler than the ceramic surface of the composite. Preferably this heating is done in a vacuum or nonoxidizing atmosphere such as hydrogen. It is also preferred that moderate pressure be applied to force the composite and substrate together with about 5 psi having been found satisfactory.

When the temperature of these structures is near the braze temperature of about 1200° C. the pressure is preferably raised to from 5 to 225 psi in order to improve contact at the substrate/composite interface and to heal minor structural flaws. After fusion of the graded composite to the substrate is complete, usually about one hour, cooling to ambient temperature is begun. It is during this cooling phase that the temperature differential or $\Delta T$ which is critical to the invention is established. The $\Delta T$ can be less with more deformable materials but it is preferably at least 200° C. It is important that a differential be established by the time the temperature of the substrate reaches approximately 850° C. Below this temperature elastic stress became dominant and must be offset by the $\Delta T$.

The manner in which the $\Delta T$ is established and maintained is not critical and various techniques are available. We have found it convenient to heat the graded composite/substrate structure to fusion by placing a graphite susceptor against the composite and then surrounding the susceptor with an induction heating coil to heat up the susceptor and the adjacent composite. Other heating means also could, of course, be employed.

IN THE DRAWINGS

Figure 1:
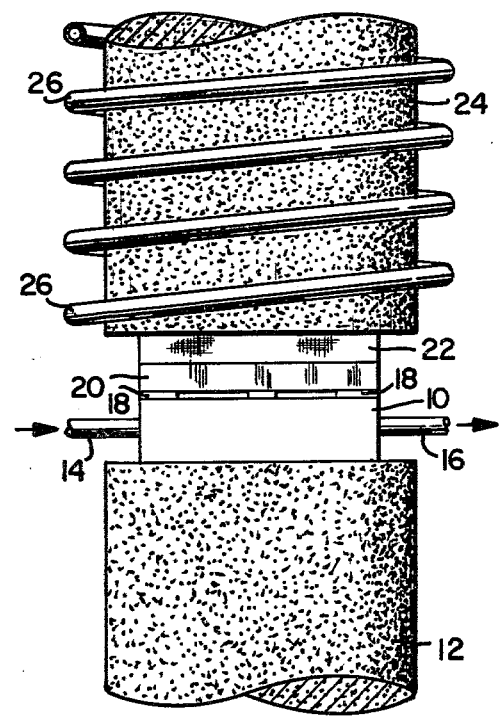
FIG. 1 shows a small scale graphite susceptor apparatus for heating and then coating while maintaining a $\Delta T$, using a metal shim separator and a heat sink with water cooling.

During cooling the $\Delta T$ is established by removing heat from the substrate in any appropriate manner. In the drawing FIG. 1 illustrates an apparatus we have devised and used heating and cooling small samples according to the invention. A copper base 10 is mounted on a graphite block 12 and cooled by water which passes into the block 10 through cooling conduit 14 and is exhausted through exhaust conduit 16. On top of the copper base 10 are metal shims 18 which separate the substrate 20 from the copper base 10 and serve as a heat sink. Next to the substrate 20 is metal/ceramic composite 22, with a layer of braze powder or braze tape between them. Above the composite 22 is a graphite susceptor 24 which is heated by a water cooled electrical coil 26 which surrounds the susceptor 24 and can be energized to induce a current in the susceptor 24 and thus heat it up. The susceptor 24 also serves as a ram which can be used to exert pressure on the substrate 20 and composite 22. The entire apparatus is inside a vacuum vessel, not shown, to permit a vacuum or inert gas atmosphere during the heating and/or cooling.

Figure 2:
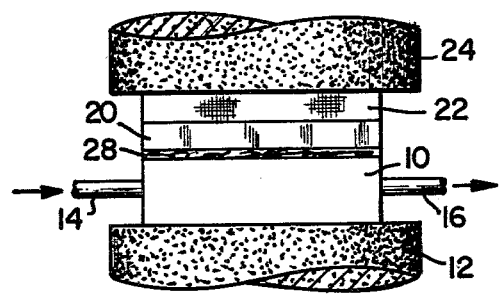
FIG. 2 shows a small scale graphite susceptor apparatus for heating and then cooling while maintaining a $\Delta T$, using a fibrous insulator and a heat sink with cooling water.

The coil 26 heats the susceptor 24 and thus the composite 22 and substrate 20, with a braze tape or braze powder between them to brazing temperature, with pressure maintained at at least 5 psi by a ram acting on the susceptor 24. After brazing is complete, cooling to ambient temperature is begun. The heat sink effect of the metal shim 18 and the water cooling of the copper base 10 serve to cause the substrate 20 to cool more rapidly than the composite 22 and thus maintain a $\Delta T$ or temperature differential between the two during cooling. The metal shims 18 shown here are flat metal strips but if desired crimped or corrugated strips can be used during heating and then collapsed by pressure for the cooling process whereby they become heat sinks. In a variation of the equipment which we have also used a fibrous insulator or ceramic pad 28 is substituted for the metal shims 18 as shown in FIG. 2.

Figure 3:
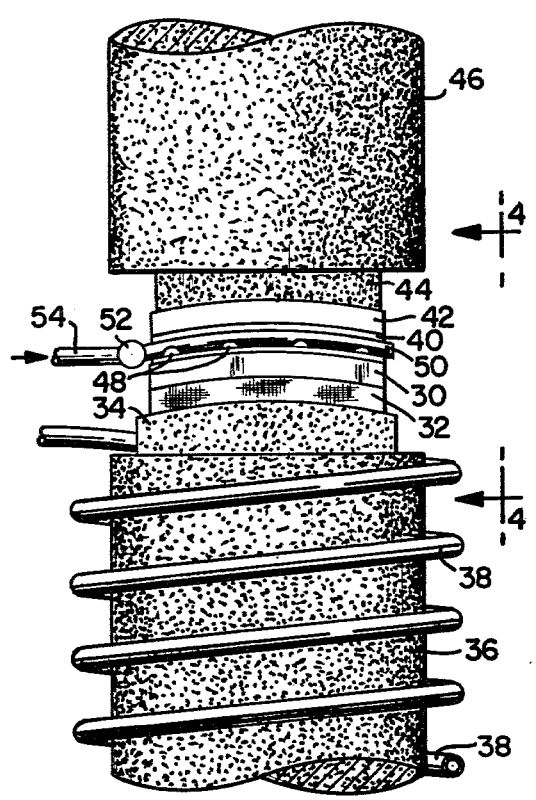
FIG. 3 shows a small scale graphite susceptor apparatus for heating and then cooling while maintaining a $\Delta T$, using cooling gas.
Figure 4:
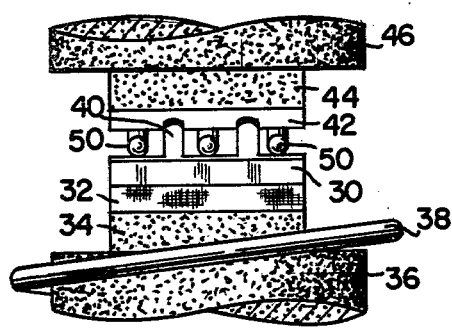
FIG. 4 is a partial view of the apparatus of FIG. 3 in a side view.

In FIGS. 3 and 4 is illustrated a somewhat different apparatus which has also been employed to practice the process of the invention. In this embodiment the substrate 30 and metal/ceramic composite 32 are both curved as are abradable seal members in jet aircraft engines. The composite 32 rests on a curved graphite support block 34, which rests on and forms an extension of the graphite susceptor 36. A water cooled electrical coil 38 heats the susceptor 36 and support block 34. The substrate 30 is placed on top of the composite 32 with a layer of brazing powder or brazing tape between them. Downward pressure is exerted on the substrate 30 and composite 32 through two pressure bars 40 which rest on the substrate 30 and are attached to pressure plate 42. A graphite pressure block 44 rests on the pressure plate 42 under a graphite cylinder 46.

Hydraulic rams, not shown, act on the cylinder 46 and susceptor 36 to exert pressure on the substrate and composite. The entire apparatus is inside a vacuum vessel, not shown, to permit a vacuum or inert gas atmosphere during the heating and/or cooling. Preferential cooling of the substrate 30 is achieved by directing a gas against the substrate 30 through holes 48 in tubes 50 which are connected to manifold 52, which in turn is connected to a supply of cooling gas, not shown, by supply conduit 54. In some of our work with this apparatus we found it useful to insulate the exterior surface of the susceptor 36 with a graphite felt mat wrapped around it. This wrapping which is not shown merely served to increase the efficiency of the induction heating.

Our invention is useful with graded composites made with various metals and ceramics. Suitable ceramics or refractories include alumina, zirconia, ceria, yttria, silica and magnesia. Suitable metal alloys include nickel/chromium, cobalt/chromium, iron/chromium and the like, to which aluminum or titanium can be added. A full description of an abradable composite member which can be suitably bonded to a substrate by this invention, is to be found in U.S. Pat. No. 3,975,165.

Examples I, II and III which follow exemplify the invention and show different ways a temperature differential can be established and maintained. Following the examples is a control experiment which illustrates the difficulties encountered when a temperature differential is not maintained.

EXAMPLE I

A five layer graded composite was formed from the following materials:
A. 35/60 Tyler mesh $Z_rO_2$ agglomerate
B. 100/250 Tyler mesh $Z_rO_2$ agglomerate
C. −325 Tyler mesh $Z_rO_2$ powder
D. 75 Wt. % 100/250 Tyler mesh and 25% 140/270 Tyler mesh 80% Ni 20% Cr powder
E. Ludox 130 M is a colloidal silica solution manufactured by E. I. duPont Co.

The composition of each of the five layers was as follows:

| Layer No. | Thickness in inches | Percent by weight of A | B | C | D | Percent of total of A, B, C & D E |
|---|---|---|---|---|---|---|
| 1 | 0.133 | 45 | 45 | 10 | — | 12.5 |
| 2 | 0.025 | 10 | 30 | 30 | 30 | 15 |
| 3 | 0.025 | — | 10 | 40 | 50 | 15 |
| 4 | 0.025 | — | 5 | 25 | 70 | 15 |
| 5 | 0.025 | — | 10 | — | 90 | 15 |

Layers 1 through 5 were each mixed with sufficient water and Ludox 130 M to form a damp mixture. Layer 5 was first spread in a mold to form a square 2.75 inch by 2.75 inch by 0.025 inches thick. Layers 4, 3, 2 and 1 were stacked successively on top of layer 5 and the layered structure was pressed together at 10,000 psi. The substrate used was an Inconel 600 plate measuring 2.75 inch by 2.75 inch by 0.125 inch thick. Inconel 600 is a nickel/chrome alloy made by Huntington Alloys Inc. It was uniformly coated with AMI 400 braze powder which then fused to the surface after heating to a temperature of 1125° C. in a hydrogen atmosphere for 15 minutes. AMI 400 braze powder is made by Alloy Metals Inc. The apparatus used was that shown in FIG. 2. A water cooled copper base plate within a vacuum hot press unit was used to support the work assembly. Stacked above the copper base in the following order were a 0.020 inch thick sheet of Fiberfrax refractory fibrous insulation, the Inconel plate with braze powder fused coating, the graded composite and a graphite block susceptor. Fiberfrax is made by the Carborundum Co. The braze coated surface of the Inconel plate faced the metal-rich surface of the graded composite and the ceramic-rich surface was in contact with the graphite susceptor. The induction coil was positioned symetrically around the susceptor. Temperature readings were made with an optical pyrometer by sighting into blackbody holes drilled into the substrate and susceptor. The susceptor hole was 0.100 inch from the susceptor/ceramic interface.

After a vacuum of $10^{-4}$ torr was attained, the susceptor was heated by the induction coil to a maximum temperature of 1390° C. in one hour. The Inconel substrate reached 1200° C. After a holding period of 15 minutes at temperature cooling was started. At the end of one hour the susceptor and substrate temperature were 980° C. and 860° C. respectively, with the ΔT or temperature differential only 120° C. A pressure of approximately 5 pounds per square inch gauge was maintained on the work pieces throughout the furnacing operation by means of a hydraulic ram.

After cooling was completed to ambient temperature the graded composite was found to be well sintered and bonded to the substrate. No measurable shrinkage had occurred. The metal/ceramic composite and the substrate had however buckled and assumed a curvature equal to a 50 inch radius. This large deformation could be attributed to the small temperature differential or ΔT.

EXAMPLE II

A five layer graded composite was formed from the following materials:
A. 35/60 Tyler mesh $Z_rO_2$ agglomerate
B. 100/250 Tyler mesh $Z_rO_2$ agglomerate
C. −325 mesh $Z_rO_2$ powder
D. 75% 100/250 Tyler mesh and 25% Tyler mesh 80% Ni 20% Cr powder.

The composition of each of the five layers was as follows:

| Layer No. | Thickness in inches | Percent by weight of A | B | C | D | Percent of total of A, B, C & D E |
|---|---|---|---|---|---|---|
| 1 | 0.133 | 45 | 45 | 10 | — | 12.5 |
| 2 | 0.025 | 10 | 30 | 30 | 30 | 15 |
| 3 | 0.025 | — | 10 | 40 | 50 | 15 |
| 4 | 0.025 | — | 5 | 25 | 70 | 15 |
| 5 | 0.025 | — | 10 | — | 90 | 15 |

Layers 1 through 5 were each mixed with sufficient water and Ludox 130M to form a paste. Layer 5 was first spread as a flat surface to form a square 2.75 inch by 2.75 inch by 0.100 inches thick. The remaining four layers were stacked successively on top of layer 5 and the layer structure was pressed at 10,000 psi. The substrate was an Inconel plate measuring 2.75 inch by 2.75 inch by 0.125 inch thick. It was uniformly coated with AMI-400 braze powder which then fused to the surface after heating to a temperature of 1125° C. in a hydrogen atmosphere for 15 minutes. The apparatus used was that shown in FIG. 1 of the drawings. A water cooled copper base plate within a vacuum hot press unit was used to support the work assembly. Stacked above the copper base in the following order were a 0.015 inch thick tantalum foil shim, the Inconel plate with braze powder fused coating, the graded composite and graphite block susceptor. The braze coated surface of the Inconel plate faced the metal-rich surface of the graded composite and the ceramic-rich surface was in contact with the graphite susceptor. The induction coil was positioned symmetrically around the susceptor. Temperature readings were made with an optical pyrometer by sighting into black-body holes drilled into the substrate and susceptor. The susceptor hole was 0.100 inch from the susceptor/ceramic interface.

After a vacuum of $10^{-4}$ torr was attained, the susceptor was heated by the induction coil to a maximum temperature of 1610° C. in one hour. The Inconel substrate reached 1112° C. After a holding period of 15 minutes at temperature cooling was started. At the end of one hour the susceptor and substrate temperature were 1150° C. and 860° C. respectively, with the $\Delta T$ or temperature differential equal to 290° C. A pressure of approximately 5 pounds per square inch gauge was maintained on the work pieces throughout the furnacing operation by means of a hydraulic ram.

After cooling was completed to ambient temperature the graded composite was found to be well sintered and bonded to the substrate. No measurable shrinkage had occurred. The metal/ceramic composite and the substrate had however buckled to some extent and assumed a curvature equal to 100 inches. This smaller deformation than in Example I could be attributed to the greater temperature differential or $\Delta T$ achieved by using the tantalum foil shim instead of the Fiberfrax. The tantalum shim has a substantially higher thermal conductivity than the Fiberfax, resulting in the greater $\Delta T$.

EXAMPLE III

A five layer graded composite was formed from the following materials:

A. 35/60 Tyler mesh $Z_rO_2$ agglomerate
B. 100/250 Tyler mesh $Z_rO_2$ agglomerate
C. −325 Tyler mesh $Z_rO_2$ powder
D. AMI 400 Braze powder
E. 100/250 mesh 80% Ni 20% Cr powder
F. Ludox 130 M The composition of each of the five layers was as follows:

| Layer No. | Thickness in inches | Percent by Weight of A | B | C | D | E | Percent of total of ABCDE F |
|---|---|---|---|---|---|---|---|
| 1 | 0.100 | 45 | 35 | 20 | — | — | 10 |
| 2 | 0.025 | 10 | 20 | 40 | — | 30 | 7.5 |
| 3 | 0.025 | 10 | 15 | 25 | — | 50 | 7.5 |
| 4 | 0.025 | 25 | — | — | 10 | 65 | 7.5 |
| 5 | 0.025 | porous sheet of 80% Ni 20% Cr | | | | | |

Layers 1 through 4 were mixed with sufficient water and Ludox 130 M to form a paste. Layer 1 was first spread in a mold to form a layer 2.25 inch by 3.25 inch by 0.100 inches thick. The remaining layers were stacked successively on top of the first and the total was pressed at 10,000 psi. The substrate used was a curved Mar M509 alloy plate measuring 2.25 inch by 3.25 inch by 0.250 inch thick and having a 19 inch radius of curvature. Mar M509 alloy is a cobalt/chromium alloy made by Pratt and Whitney. The concave surface of the plate was uniformly coated with AmI-400 braze powder which then fused to the surface after heating to a temperature of 1125° C. in a hydrogen atmosphere for 15 minutes. The apparatus used was that shown in FIGS. 3 and 4 of the drawings.

A convex surfaced graphite susceptor base plate resting on a graphite block base was used to support the work assembly within a vacuum hot press unit. Stacked above the convex susceptor in the following order were the graded composite, the Mar M alloy plate with fused braze powder coating and concave surfaced graphite pressure plate and bars. The braze coated surface of the Mar M alloy plate faced the metal-rich surface of the graded composite and the ceramic-rich surface was in contact with the concave graphite susceptor. The concave pressure bars had spaces between them for cooling gas tubes. The induction coil was positioned around the graphite block supporting the convex graphite susceptor. Temperature readings were made with an optical pyrometer by sighting into black-body holes drilled into the concave graphite susceptor and the substrate.

After a vacuum of $10^{-4}$ torr was attained the induction coil was used to heat the work pieces on which a pressure of 5 pounds per square inch gauge was maintained by means of a hydraulic ram. When the braze temperature of 1170° C. was reached the ram pressure was increased to 150 pounds per square inch gauge and maintained at this figure throughout the furnacing operation. When the braze temperature was reached and the ram pressure increased the vessel was back-filled with argon and slow purging was maintained for one hour. During this period the substrate and convex graphite susceptor temperature were 1090° C. and 1500° C. respectively for a temperature differential or $\Delta T$ of 410° C. At the end of this one hour period high velocity (60 psi gauge pressure) argon gas was discharged against the substrate backing, increasing the $\Delta T$ to 475° C. Cooling was then conducted under the same gas flow conditions. When the substrate had cooled to 860° C. the temperature of this concave graphite susceptor was 1180° C. for a $\Delta T$ of 320° C. while the actual temperature of this ceramic face was 1150° C. for a $\Delta_T$ of 290° C.

A sound structure with the graded composite well bonded to curved substrate was obtained. X-ray examinations revealed no defects and measurements indicated no buckling or deformation. The specimen prepared in this example was thermally cycled 50 times under simulated turbine engine conditions. The cycle consisted of heating the ceramic surface from 600° C. to 1400° C. in 15 seconds, maintaining maximum temperature for 120 seconds, cooling the surface to 600° C. in approximately 15 seconds, and repeating.

CONTROL EXPERIMENT

A five layer graded composite was formed from the following materials:
A. 35/60 mesh $Z_rO_2$ agglomerate
B. 100/250 mesh $Z_rO_2$ agglomerate
C. −325 Tyler mesh $Z_rO_2$ powder
D. AMI - 400 Braze powder
E. 100/250 Tyler mesh 80% Ni 20% Cr powder
F. Ludox 130 M The composition of each of the five layers was as follows:

| Layer No. | Thickness in inches | Percent by weight of | | | | | Percent of total of A, B, C, D & E |
|---|---|---|---|---|---|---|---|
| | | A | B | C | D | E | F |
| 1 | 0.100 | 45 | 35 | 20 | — | — | 7.5 |
| 2 | 0.025 | 10 | 20 | 40 | — | 30 | 7.5 |
| 3 | 0.025 | — | 25 | 25 | — | 50 | 7.5 |
| 4 | 0.025 | — | 25 | 5 | 7 | 63 | 7.5 |
| 5 | 0.025 | Porous sheet of 80% ni and 20% Cr powder | | | | | |

Layers 1 through 4 were mixed with sufficient water and Ludox 130 M to form a paste. Layer 1 was first spread in a mold to form a square 2.75 inch by 2.75 inch by 0.100 inches thick Subsequent layers were placed on the first and the total was pressed at 10,000 psi. The substrate used was a flat Mar M alloy plate measuring 2.75 inch by 2.75 inch by 0.250 inch thick. It was uniformly coated with AM1-400 braze powder which then fused to the surface after heating to a temperature of 1125° C. in a hydrogen atmosphere for 15 minutes. The apparatus used was somewhat similar to that in FIG. 1 but different in that below the substrate there was no metal shim or cooling black, but a second graphite susceptor. The electrical heating coil extended over both susceptors to heat from both sides of the composite. A graphite susceptor base plate was used to support the work assembly within a vacuum hot press unit. Stacked above the lower graphite susceptor in the following order were the Mar M alloy plate with fused braze powder coating, the graded composite and graphite block upper susceptor. The braze coated surface of the Mar M alloy plate faced the metal-rich surface of the graded composite and the ceramic-rich surface was in contact with the graphite susceptor. The induction coil was positioned symetrically around the susceptors. Temperature readings were made with an optical pyrometer by sighting into blackbody holes drilled into the substrate and susceptors. The hole in the upper susceptor was 0.100 inch from the susceptor/ceramic interface.

After a vacuum of $10^{-4}$ torr was attained, the upper susceptor was heated by the induction coil to a maximum temperature of 1215° C. in one hour. The Mar M alloy substrate reached 1215° C. After a holding period of 15 minutes at temperature cooling was started. At the end of one hour the susceptor and substrate temperature were 970° C. and respectively, with the $\Delta_T$ or temperature differential 10° C. A pressure of approximately 5 pounds per square inch gauge was maintained on the work pieces until the braze temperature of 1200° C. was reached. It was then increased to 1000 pounds per square inch gauge and maintained at this pressure through the remainder of the process throughout the furnacing operation by means of a hydraulic ram.

After cooling was completed to ambient temperature the graded composite was found to have suffered gross planar delaimination in the ceramic layer. The flawed, delaminated structure was a result of the rigid substrate and the small $\Delta_T$ or temperature differential.

What is claimed is:

1. Process for bonding a multi-layer ceramic/metal abradable composite having a ceramic-rich surface, a metal-rich surface and at least one intermediate layer to a metallic substrate which comprises placing said abradable composite with its metal-rich surface in contact with said substrate, heating said composite and substrate to a sintering temperature sufficient to bond said composite to said substrate, thereafter cooling the thus formed structure in such a manner that before the onset of elastic stresses in said structures due to said cooling a temperature differential is established across the structure, with a temperature of said substrate being maintained consistently lower than the temperature of the ceramic-rich surface of said composite during the remainder of the cooling to ambient temperatures.

2. Process according to claim 1 wherein the surface of said substrate is coated with a brazing powder prior to heating.

3. Process according to claim 1 wherein said heating to said sintering temperature and cooling are conducted in an inert atmosphere.

4. Process according to claim 3 wherein said inert atmosphere is a vacuum of at least $10^{-4}$ torr.

5. Process according to claim 3 wherein said inert atmosphere is selected from the group consisting of argon, hydrogen and nitrogen.

6. Process according to claim 3 wherein said inert atmosphere is a vacuum during heating of said composite and substrate and is argon gas during the cooling of said structure.

7. Process according to claim 1 wherein said composite and said substrate are pressed together during said heating and cooling.

8. Process according to claim 7 wherein said pressure is at least 5 pounds per square inch during heating and at least 5 pounds per square inch during cooling.

9. Method according to claim 1 wherein said sintering temperature is in excess of 800° C. and said temperature differential is at least 200° C. when the substrate has cooled to 860° C.

10. Process for producing a porous abradable seal for use on a turbine engine surface which comprises:
   a. forming a composite comprising a top layer of substantially all ceramic material, at least one intermediate layer of a mixture of ceramic material and a metallic bottom layer
   b. retaining the assembled layers in a suitable fixture under pressure and then slowly heating to dryness to thereby form a multi-layer composite c. placing the dried composite on a metallic substrate with said metallic bottom layer of said composite in contact with said substrate d. heating said composite in contact with said substrate to a sintering temperature sufficient to bond said composite to said substrate e. cooling the structure formed in step d. to an ambient temperature in such a manner that before said cooling progresses to a temperature at which stresses are set up in structures by said cooling, a temperature differential is established across said structure, with the temperature of said substrate being maintained consistently lower than the temperature of said top layer of said composite during the remainder of said cooling.

11. Process according to claim 10 wherein in step c the metallic substrate is first coated with a brazing powder prior to the placing of the composite on it.

12. Process according to claim 10 wherein steps d and e are conducted in an inert atmosphere.

13. Process according to claim 12 wherein said inert atmosphere is a vacuum of at least $10^{-4}$ torr.

14. Process according to claim 12 wherein said inert atmosphere is selected from the group consisting of argon, hydrogen and nitrogen.

15. Process according to claim 12 wherein said inert atmosphere is a vacuum in step d and argon gas in step c.

16. Process according to claim 10 wherein said composite and said substrate are pressed together during steps d and e.

17. Process according to claim 10 wherein said pressure is at least 5 pounds per square inch during step d and at least 5 pounds per square inch during step e.

18. Method according to claim 10 wherein said temperature differential in step e is at least 200° C.

* * * * *